US008290912B1

(12) United States Patent
Searls et al.

(10) Patent No.: US 8,290,912 B1
(45) Date of Patent: Oct. 16, 2012

(54) ENDPOINT VIRTUALIZATION AWARE BACKUP

(75) Inventors: Kirk L. Searls, Maitland, FL (US); Gregory R. Dowers, II, Lake Mary, FL (US)

(73) Assignee: Symantec Corporation, Mountain View, CA (US)

( * ) Notice: Subject to any disclaimer, the term of this patent is extended or adjusted under 35 U.S.C. 154(b) by 311 days.

(21) Appl. No.: 12/697,018

(22) Filed: Jan. 29, 2010

(51) Int. Cl.
*G06F 7/00* (2006.01)
*G06F 17/00* (2006.01)
(52) U.S. Cl. .................................... 707/654; 707/831
(58) Field of Classification Search ................... None
See application file for complete search history.

(56) References Cited

U.S. PATENT DOCUMENTS

| 5,487,167 A | 1/1996 | Dinallo et al. |
| 5,581,764 A | 12/1996 | Fitzgerald et al. |
| 5,708,796 A | 1/1998 | Ozden et al. |
| 5,712,976 A | 1/1998 | Falcon, Jr. et al. |
| 5,742,768 A | 4/1998 | Gennaro et al. |
| 5,745,380 A | 4/1998 | Sandvoss et al. |
| 5,754,774 A | 5/1998 | Bittinger et al. |
| 5,761,477 A | 6/1998 | Wahbe et al. |
| 5,764,235 A | 6/1998 | Hunt et al. |
| 5,765,164 A | 6/1998 | Prasad et al. |
| 5,787,284 A | 7/1998 | Blainey et al. |
| 5,802,292 A | 9/1998 | Mogul |
| 5,835,749 A | 11/1998 | Cobb |
| 5,878,223 A | 3/1999 | Becker et al. |
| 5,919,247 A | 7/1999 | Van Hoff et al. |
| 5,933,644 A | 8/1999 | Wallace |
| 5,974,129 A | 10/1999 | Bodnar |
| 5,978,788 A | 11/1999 | Castelli et al. |

(Continued)

FOREIGN PATENT DOCUMENTS

WO    WO97/00475    1/1997

(Continued)

OTHER PUBLICATIONS

Microsoft, "Virtualization for Windows: A Technology Overview," David Chappell, Chappell & Associates, Jul. 2007.

(Continued)

*Primary Examiner* — Jay Morrison
(74) *Attorney, Agent, or Firm* — Rory D. Rankin; Meyertons, Hood, Kivlin, Kowert & Goetzel, P.C.

(57) ABSTRACT

A system and method for efficiently utilizing endpoint virtualization information during backup operations. A computer system includes a backup server that permits the identification, browsing and selecting of files within virtual layers. Examples of virtual layers comprise at least a user data layer, an applications layer, and an operating system layer. Backup messages are sent to a corresponding client computer to backup the selected files or layers. The client computer includes a virtualization agent configured to manage one or more virtual layers in the client. In response to determining the selected data corresponds to a virtual layer of the one or more virtual layers, a backup agent in the client is configured to communicate with the virtualization agent in order to identify one or more files that correspond to the virtual layer, retrieve the one or more files, and send the one or more files to the backup server. The backup server is further able to create a different backup schedule for each virtual layer. Also, during an incremental backup of data in a virtual layer, the client computer is configured to ignore files outside of the virtual layer.

21 Claims, 6 Drawing Sheets

U.S. PATENT DOCUMENTS

| | | | |
|---|---|---|---|
| 5,978,791 | A | 11/1999 | Farber et al. |
| 6,003,087 | A | 12/1999 | Housel, III et al. |
| 6,009,410 | A | 12/1999 | LeMole et al. |
| 6,073,129 | A | 6/2000 | Levine et al. |
| 6,088,524 | A | 7/2000 | Levy et al. |
| 6,122,628 | A | 9/2000 | Castelli et al. |
| 6,311,221 | B1 | 10/2001 | Raz et al. |
| 6,857,059 | B2 | 2/2005 | Karpoff et al. |
| 6,898,670 | B2 | 5/2005 | Nahum |
| 6,934,799 | B2 | 8/2005 | Acharya et al. |
| 7,007,147 | B2 | 2/2006 | Eguchi et al. |
| 7,093,086 | B1 | 8/2006 | van Rietschote |
| 7,386,662 | B1 | 6/2008 | Kekre et al. |
| 7,526,514 | B2 * | 4/2009 | Chai et al. ............................ 1/1 |
| 7,634,627 | B1 * | 12/2009 | Ohr et al. ...................... 711/162 |
| 7,735,057 | B2 | 6/2010 | Rachman et al. |
| 2003/0055972 | A1 * | 3/2003 | Fuller et al. ................... 709/226 |
| 2004/0230971 | A1 | 11/2004 | Rachman et al. |
| 2005/0267920 | A1 * | 12/2005 | Helliker et al. ............... 707/204 |
| 2008/0010630 | A1 | 1/2008 | Ou-Yang et al. |
| 2009/0089522 | A1 * | 4/2009 | Kulkarni ....................... 711/162 |
| 2009/0150628 | A1 * | 6/2009 | Nakano et al. ................. 711/162 |
| 2010/0058011 | A1 * | 3/2010 | Satoyama et al. ............. 711/162 |
| 2010/0205152 | A1 * | 8/2010 | Ansari et al. .................. 707/654 |

FOREIGN PATENT DOCUMENTS

| | | |
|---|---|---|
| WO | WO97/46955 | 12/1997 |
| WO | WO98/11723 | 3/1998 |

OTHER PUBLICATIONS

Microsoft, "Windows Server Virtualization—An Overview," May 2006.

"Virtualization from the Datacenter to the Desktop, Building a Comprehensive, end-end virtualization strategy," 2007 Core Infrastructure Optimization, Microsoft Corporation 2007.

U.S. Appl. No. 11/009,108, filed Dec. 10, 2004.

"What is Volume Shadow Copy Service?," Microsoft Corporation, 2004, 5 pages.

Yang Yu, et al: "A Feather-weight Virtual Machine for Windows Applications"; Jun. 14, 2006; pp. 24-34.

Japanese Patent Application Laid-open No. Hei 10-133976, published May 22, 1998.

Japanese Patent Application Laid-open No. Sho 64-36332, published Feb. 7, 1989.

Japanese Patent Application Laid-open No. Hei 10-162057, published Jun. 19, 1998.

G. Glass, "A Universal Streaming Service", C++ Report, Apr. 1996, pp. 74-76 and 81-83.

T. Ritchey, "Java!", New Riders Publishing, Dec. 1995, pp. 214-216.

Chen, Z. et al., (Dec. 11-14, 1995) "Real time video and audio in the world wide web" World Wide Web Journal, Fourth International World Wide Web Conference, pp. 333-348.

Jiang, Z. and Kleinrock, L. (1997) "Prefetching links on the WWW" IEEE International Conference on Communications (ICC), US, New York, NY: IEEE, pp. 483-489.

M. Schwartz, "Telecommunication Networks: Protocols, Modeling and Analysis", Jan. 1, 1987; Addison-Wesley Publishing Company, pp. 266-283.

J. Basu et al., "Degrees of Transaction Isolation in SQL *Cache: A Predicate-based Client-side Caching System", May 15, 1996, pp. 1-22.

Amit Shukla et al., "Storage Estimation for Multidimensional Aggregates in the Presence of Hierarchies", VLDB Conference Mumbai (Bombay), 1996, pp. 522-531.

Dale Skeen, "New Forms of Persistent Queries Are Necessary to Handle Live Business Data as it Speeds Through a Company", internet website www.byte.com BYTE Magazine, Feb. 1998, 5pgs.

V. Hoff et al., "The Open Software Description Format (OSD)", internet website www.w3.org, Aug. 11, 1997, pp. 1-13.

Red Brick Vista, "Aggregate Computation and Management", internet website www. informix.com, printed Oct. 4, 2000.

Fireclick, "Web Site Performance is Key to E-Commerce Sucess", internet website WWW. Fireclick.com printed, Nov. 1, 2000.

Boost Web Optimizer Technology Overview, "How it Works", Sep. 27, 2000 and internet website www.boostworks.com printed Nov. 1, 2000.

"Delivering Windows to the Net White Paper", WinToNet by Menta Software, 2000 and Website http://216.205.21.102/ printed Nov. 1, 2000.

"First There was Streaming Audio, then Streaming Video. Now get ready for Streaming Software", Stream Theory White paper and Website WWW.Streamtheory.com printed Sep. 22, 2000.

"OSD Describing Software Package on the Internet", Marimba Inc. White paper 1998 and wedsite www.marimba. com, printed Nov. 1, 2000.

"Timbale for Windows Terminal Services" Marimba Promotional document, undated, 2000.

Japanese Patent Application Laid-open No. Hei 8-51596, published Feb. 20, 1996.

Japanese Patent Application Laid-open No. Hei 10-91446, published Apr. 10, 1998.

Japanese Patent Application Laid-open No. Hei 7-271603, published Oct. 20, 1995.

Japanese Patent Application Laid-open No. Hei 8-6878, published Jan. 12, 1996.

"XMP, Adding Intelligence to Media, XMP Specification Part 3, Storage Files": Adobe Systems Incorporated, 2008, pp. 1-86.

* cited by examiner

ENDPOINT VIRTUALIZATION AWARE BACKUP

BACKGROUND OF THE INVENTION

1. Field of the Invention

This invention relates to the field of computing system data backup and, more particularly, to utilizing an endpoint virtualization aware backup system.

2. Description of the Related Art

As computer memory storage and data bandwidth increase, so does the amount and complexity of data that business manages. A large portion of the data may involve content managed for a company by a dedicated server. This dedicated server may include or be coupled to a data storage subsystem comprising hard disks or other storage devices for the storage of a large amount of information. This dedicated server and storage subsystem may provide users the ability to search and access information, including electronic documents, photographic or other still images, video streams, audio files, volume image backup files, etc.

Because the various examples of stored data may frequently contain crucial information, the contents of information servers and end-user systems may be backed up to a backup storage to prevent loss of data. In such a case, the dedicated server and storage subsystem may include a backup system. A backup system attempts to reduce the amount of data and time to backup required data to protect a machine. Some methods use de-duplication to reduce the amount of data to backup, but such methods may still consume time and network bandwidth to implement. For example, performing a scheduled backup, even an incremental backup, on an end-user laptop via a network, consumes time to scan files and detect changed files. The scanning and detecting of files consumes a large amount of time prior to using a de-duplication or other method.

In addition to consuming a large amount of time in performing backups, administering and supporting an information technology (IT) infrastructure on a large number of end-user systems presents a significant challenge. With so many distributed systems, it may be slow and/or difficult to roll out new applications, update existing ones, remove obsolete ones, and backup data across an entire organization. Also, without the ability to tightly control end-point environments, supporting and troubleshooting end-user systems and efficiently protecting crucial data may become extremely burdensome. Administrators may need more flexibility in the methods they use to protect their systems.

In view of the above, methods and mechanisms for enabling applications for efficiently backing up data on end-point user systems within an IT infrastructure are desired.

SUMMARY OF THE INVENTION

Systems and methods for efficiently utilizing endpoint virtualization information during backup operations. In one embodiment, a computer system is provided including a backup system on a backup server that allows identifying, browsing and selecting particular files within particular virtual layers. Examples of virtual layers comprise at least a user data layer, an applications layer, and an operating system layer. Backup messages or jobs are sent to a corresponding client computer to backup the selected files or layers. The client computer includes a virtualization agent configured to manage one or more virtual layers in the client. In response to a discovery type request from a backup manager, a backup agent in the client is configured to communicate with the virtualization agent in order to identify details concerning any virtualization environments on the client. Such details may include what, if any, virtual layers exist on the client, and what data corresponds to each virtual layer. Responsive to receiving the details, the backup agent may report the details to the backup manager. Utilizing the received information, the backup manager may then initiate commands to the backup agent which direct the agent to perform a backup procedure on only data that corresponds to a specified virtual layer. In response, the backup agent may convey corresponding data to the backup manager without needing to communicate with the virtualization agent.

In some embodiments, the backup system is able to create a different backup schedule for each virtual layer. In further embodiments, in response to receiving an incremental backup message from the backup server, the client computer is able to ignore files corresponding to a first virtual layer but scan files to detect changed files corresponding to a second virtual layer.

These and other embodiments are described and contemplated, and will be appreciated upon reference to the following description and figures.

Figure 1:
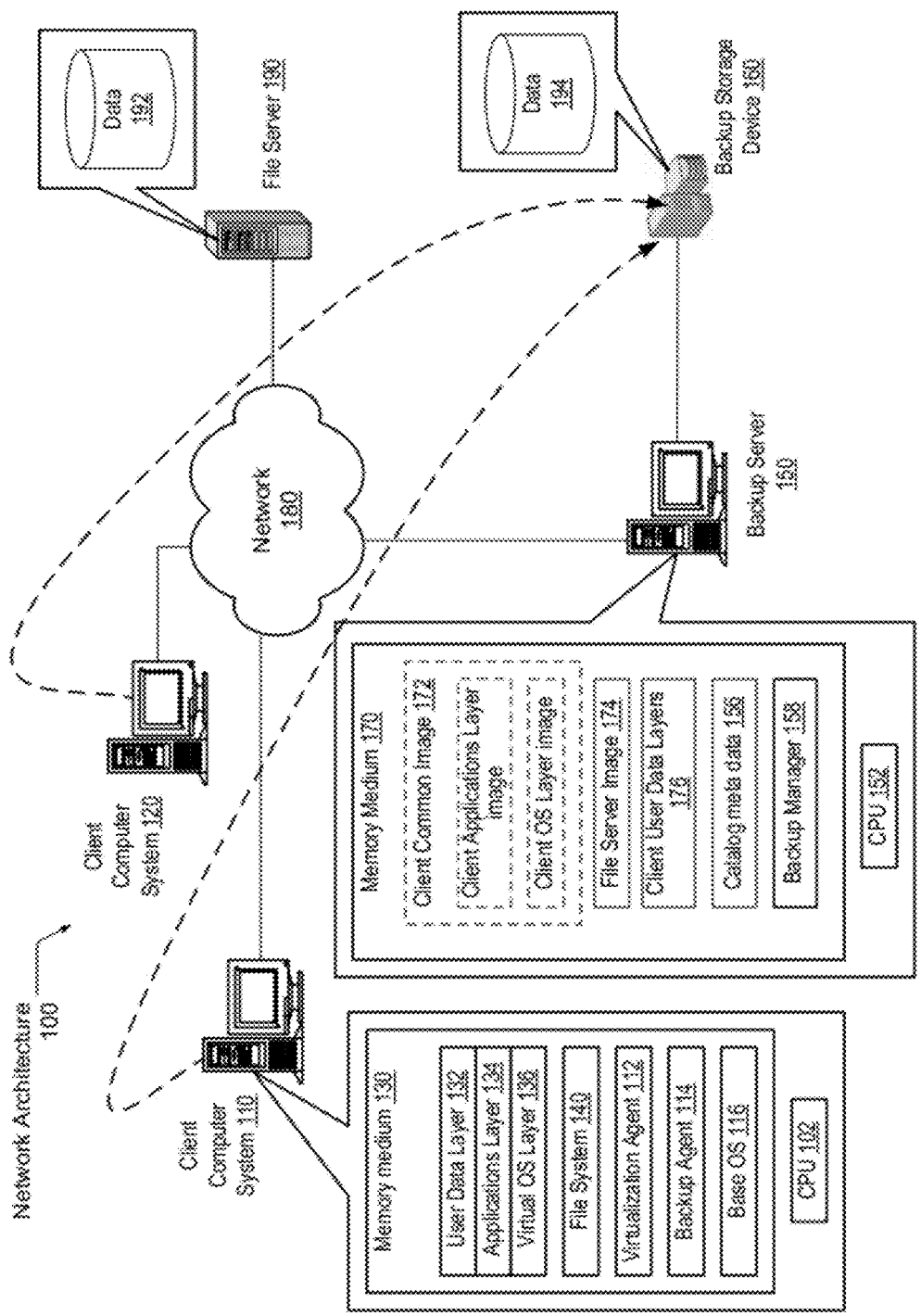
FIG. 1 is a generalized block diagram illustrating one embodiment of a network architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Referring to FIG. 1, a generalized block diagram of one embodiment of a network architecture 100 is shown. As described further below, network architecture 100 may include client computer systems 110 and 120 with a backup agent 114 that communicates with a backup manager 158 on a backup server 150. In addition, the backup agent 114 may be configured to interface directly with an endpoint virtualization system. For example, in one embodiment, within the memory medium 130 of client computer system 110, the backup agent 114 may include software with an application programming interface (API) that interfaces directly with an API within a virtualization agent 112. In one embodiment, endpoint virtualization involves a process whereby I/O requests may be transparently redirected to a given virtual layer without the base operating system being aware that the I/O is being redirected. In various embodiments, virtual layers may also be isolated from one another and/or the base operating system. In such an embodiment, applications that would otherwise be incompatible on a given client system may be run concurrently in isolated virtual layers on the same client. In various embodiments, virtual layers are only identifiable on the client by the virtualization agent.

IT administrators may use the virtualization agent 112 mentioned above within an endpoint virtualization application. By using an endpoint virtualization system, the IT administrators may separate at least the virtual operating system (OS), applications, and user data into different virtual layers. Virtual layers 132, 134, and 136 illustrate these layers within the memory medium 130 of the client computer system 110. Using the direct interface between the APIs of the backup agent 114 and the virtual layer 112, IT administrators, via the backup manager 158 on backup server 150, may protect only predetermined chosen virtual layers. For example, backup manager 158 may not backup files within certain virtual layers that use a common image on multiple client computer systems. For example, the IT administrators may use virtual layer information available to the backup manager 158 to choose to forego backups of the virtual OS layer 136. Also, during an incremental backup, the backup agent 114 may ignore files of a first virtual layer, such as the virtual OS layer 136. However, the backup agent 114 may be instructed to scan files to detect changed files within a second virtual layer, such as user data layer 132.

FIG. 1 illustrates an example of a system capable of the described features according to one embodiment. Further details are provided below. Referring to FIG. 1, a further description of the components of network architecture 100 is provided below. Also, descriptions of the backup and endpoint virtualization systems are provided. Afterward, a description of a backup system interfacing directly with an endpoint virtualization system within network architecture 100 is provided.

Components of a Network Architecture

As shown, network architecture 100 includes client computer systems 110 and 120 interconnected through a network 180 to one another, to a file server 190, and to a backup server 150. Disk storage 160 is coupled to backup server 150. Network 180 may include a variety of techniques including wireless connection, direct local area network (LAN) connections, wide area network (WAN) connections such as the Internet, a router, and others. Network 180 may comprise one or more LANs that may also be wireless. Network 180 may further include remote direct memory access (RDMA) hardware and/or software, transmission control protocol/internet protocol (TCP/IP) hardware and/or software, router, repeaters, switches, grids, and/or others.

In one embodiment of network architecture 100, client computer systems 110 and 120 are representative of any number of stationary or mobile computers such as desktop PCs, laptops, handheld computers, etc. The client computer systems, or clients, 110 and 120 may include a processor 102 and a memory medium 130. Clients 110 and 120 may use processor 102 to execute instructions of software applications. The clients 110 and 120 may contain one or more software applications on its memory medium 130. For example, clients 110 and 120 may include a backup agent 114 that may be a relatively small user mode software program. Similarly, clients 110 and 120 may include a virtualization agent 112 that may be relatively small kernel mode software program. Both agents 114 and 112 are described further below.

In some embodiments, the clients 110 and 120 may include an operating environment, e.g. an operating system, such as base OS 116 and a virtual OS layer 136. In some embodiments, the clients 110 and 120 have only a virtual OS layer 136 provided by an IT administrator using a common image of the layer. In other embodiments, clients 110 and 120 have both a base OS 116 and a virtual OS layer 136, which is further described below. The operating system may interface between the system hardware and the software applications.

As briefly mentioned above, clients 110 and 120 may be configured to include non-virtualized software components, or base components, or virtualized software components, or both. For example, in one embodiment, client 110 may have both types of software components. In such an embodiment, client 110 has a base operating system, such as base OS 116, that is installed on client 110 and executes without any virtualization agent. In various embodiments, the base OS 116 provided on client 110 may be any of various operating systems, including MS-DOS®, MS-WINDOWS®, OS/2®, UNIX®, Linux®, Solaris® or another known operating system. A further description of the virtual layers, such as the virtual OS layer 136, the applications layer 134, and the user data layer 132, are further described shortly.

Continuing with the components of clients 110 and 120, a file system 140 may be included. Similar to a file system on the file server 190, the backup server 150, or any other computer system or server, file system 140 may operate as a special-purpose database for the storage, organization, manipulation, and retrieval of data. A user may browse the directories stored on a corresponding data storage medium via the file system 140. The file system 140 may be coupled to one or more filter drivers. Generally speaking, a file system filter driver may be configured to intercept requests targeted at file system 140 or another file system filter driver. By intercepting a request before the request reaches its intended target, the filter driver may extend or replace the functionality provided by the original target of the request. Examples of file system filter drivers include anti-virus filters, backup agents, and encryption products.

The file server 190 in network architecture 100 may be any kind of server configured to store data. In one embodiment, file server 190 may be a Network-Attached Storage (NAS) device. The file server 190 may be a computer specialized for providing file storage services to clients 110 and 120 and other information servers (not shown). The operating system and other software on the file server 190 provide the functionality of file systems, the access to files, and the management of these functionalities. A file server 190 is typically not designed to perform general-purpose computing tasks other than file storage. The file server 190 may not have a keyboard or display, and is instead controlled and configured over the network 180, sometimes by accessing its network address from a web browser.

Continuing with a description of the file server 190, a general-purpose operating system is usually not needed on the file server 190. Rather, a stripped-down operating system with minimal functionality may be used instead. The file server 190 may include one or more hard disks, often arranged into logical, redundant storage containers or RAID arrays (redundant arrays of inexpensive/independent disks).

The data 192 may be stored on one or more of the hard disks of the file server 190.

The file server 190 may provide data storage at the file system level. The file server 190 may use file-based protocols such as Network File System (NFS) (popular on UNIX systems), SMB/CIFS (Server Message Block/Common Internet File System) (used with MS Windows systems), or AFP (used with Apple Macintosh Computers). In the example of FIG. 1, files on the file server 190 may be accessed through a Network File System (NFS) interface included in network 180.

Turning now to the backup storage device 160, device 160 may be used to store backup copies of data within the network architecture 100. Backup data 194 may store copies of data 192, copies of data included in clients 110 and 120, and copies of data included in other information servers (not shown). Backup storage device 160 may include or be further coupled to several varieties of storage consisting of one or more hard disks, tape drives, server blades, or specialized devices, and may include a variety of memory devices such as RAM, Flash RAM, MEMS (Micro Electro Mechanical Systems) storage, battery-backed RAM, and/or non-volatile RAM (NVRAM), etc.

In alternative embodiments, the number and type of clients, servers, and storage devices is not limited to those shown in FIG. 1. Almost any number and combination of servers, desktops, laptops, and mobile clients may be interconnected in network architecture 100 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to network architecture 100.

Endpoint Virtualization

The network architecture 100 may have a large pool of end-user computer systems, such as clients 110 and 120, file server 190, and other information servers not shown. In such an architecture with a large number of end-user systems, many IT administration issues may lead to time-consuming and expensive practices. These practices may include at least resolving software application conflicts, repairing damaged software applications, migrating to new versions of software applications, and/or installing and patching applications. Techniques involving software virtualization have proved to be a powerful technology to mitigate the above issues, to simplify software development and testing, to enable server consolidation, and to enhance datacenter agility. Virtualization broadly describes the separation of a service request from the underlying physical delivery of that service. In one example, virtualization may be performed by a file system filter driver configured to intercept system calls from virtualized applications before they reach the file system and redirect those system calls to the corresponding system files of a corresponding virtual software layer.

A virtual software layer, or virtual layer, may be added between the hardware, such as CPU 102, and the base OS 116. Clients 110 and 120 may include predetermined and obscured locations within their respective file systems 140 for storing the contents of virtual software layers. As described above, a file system filter driver may intercept and redirect system calls to a predetermined redirection area corresponding to an associated virtual software layer. Each virtual software layer may contain its own version of various system files and configuration settings, which may overlap in name and/or purpose with some of those already on the clients 110 and 120 or in other virtual layers. However, applications encapsulated in a virtual software layer may be configured to use system files and settings stored in the virtual software layer rather than those stored on the actual physical machine (a.k.a., the base environment).

In one embodiment, an endpoint software virtualization system may be used for end-user clients 110 and 120. In addition, for file server 190 and any other information servers, a hypervisor may be used to support higher-level virtual machines (VMs). A hypervisor is a virtual software layer that runs directly on the hardware without the need of a host OS. A hypervisor may need hardware assistance. Privileged and sensitive calls within a corresponding OS may be set to automatically trap to the hypervisor, removing a requirement for binary translation. For the remainder of the description, the focus will be on the endpoint software virtualization system for end-user clients 110 and 120.

Using an endpoint virtualization system, an IT administrator may configure one or more virtual software layers, wherein each contains any number of applications and/or data files, and deploy those virtual software layers from a server to end-user systems, such as clients 110 and 120, in an automated fashion. For example, an IT administrator may use a client common image 172 for a client OS virtual software layer and for an applications virtual software layer. Multiple virtual software layers may be included in the client common image 172. Each software application may rely on various different system files (e.g., dynamic link libraries or DLLs, drivers, configuration files, .sys files, etc.) and/or other settings, such as registry entries. By using virtual software layers, various applications can be encapsulated along with their corresponding system files and settings in respective virtual software layers.

The corresponding system files mentioned above that support various applications are kept separate from other system files (e.g., those on the base environment or in other virtual layers). Therefore, application installations may be less likely to interfere with one another. For example, if installing a first application includes installing a new version of a DLL, then by deploying the application in a virtual software layer, an IT administrator may ensure that the installation does not affect other applications that rely on the older version of the DLL. Although clients 110 and 120 are shown to have a single user data virtual software layer 132, a single applications virtual software layer 134, and a single virtual OS software layer 136, there may be several virtual software layers within each of these categories.

Using a management interface, such as a command-line interface or a graphical user interface (GUI), the IT administrator may create layers, deploy layers, and activate and deactivate layers. As used herein, the term "layers" refers to virtual software layers. When an IT administrator activates a layer (again, using a management interface), the application(s) captured therein is available to users who access the machine, such as client 110. No setup or installation is required. From the perspective of users and the base OS 116, virtualized applications are indistinguishable from conventionally installed applications. To make applications that reside in active layers available and indistinguishable from conventionally installed applications, the virtualization agent 112 redirects system calls for the applications' files, processes, and settings. When layers are not active, the virtualization agent 112 uses this same redirection technology to obscure the existence of the layers' contents—from users and from the base OS 116.

In one embodiment, the virtualization agent 112 resides within the kernel space of memory medium 130 of client 110. In one embodiment, the virtualization agent 112 may include a file system filter driver and a DLL that provides one or more application programming interfaces (APIs). For example, the DLL may include a C programming language API and a base OS 116 interface, which provides an operating system interface through which instrumented components provide information and notification. Such an interface may allow scripting languages to manage the base OS 116 personal computers, such as clients 110 and 120. In this manner, management information may be shared between management applications. Alternatively, these APIs may be used to access information within the endpoint virtualization system as further described later.

Backup System on the Network Architecture

In one embodiment, data stored on clients 110 and 120 of FIG. 1 may be sent to file server 190 for storage. The data that holds the information used and produced by software applications and stored for later use may be referred to as a computer file, or file. Computer files may include photographic or other still images, documents, spreadsheets, video streams, audio files, plain text files, a computer program language object and executable files and libraries, or any other kind of data. Users on clients 110 and 120 may perform the data transfer from clients 110 and 120 to the file server 190. For example, when clients 110 and 120 are connected to network 180 (the clients are online), the users may save computer files to directory locations corresponding to predetermined locations on the file system of file server 190. These computer files may now be included in data 192. Alternatively, the users may update files already stored on file server 190 by opening the files, updating the files, and closing the files.

In one embodiment, the backup server 150 in network architecture 100 may include a backup application 158. This backup application 158, or "backup manager" may comprise program instructions stored on the memory medium 170 and executable by the processor 152 to perform one or more backup operations. Backup operations may include creating partial or full backups, e.g., on a computer system or from one computer system to another system; performing restore functions (e.g., partial or granular restore functions, or full restore functions) on a computer system or from one computer system to another computer system; backup operations may also include other operations.

The backup manager 158 on backup server 150 may be configured to create various types of backups of data 192. For example, image based, file based, or other types of backups may be created. In some embodiments, the backup manager 158 may receive user input directing the backup manager 158 to create a backup of a specific system, such as file server 190. In some embodiments, the backup manager 158 may create a backup of a specific system automatically, e.g., the backup manager may be scheduled to perform regular backups of a specific system. The backup manager 158 may create and store the backup, or the file server image 174, in a commonly known file format, such as the Virtual Hard Disk (VHD) format, the V2I format, and the Virtual Machine Disk Format (VMDK) format.

Continuing with a description of a data backup operation, in one embodiment, the backup manager 158 on backup server 150 may create the backup of data 192, such as file server image 174, and store it on the backup storage device 160. In another embodiment, the backup manager 158 may store the backup on the backup server 150, e.g., on a memory medium 170 of the backup server 150, as shown. In yet other embodiments, the backup manager 158 may instead store the backup on another device, e.g., on another computer system (such as another server) connected over the network 180. In any of the embodiments, a backup copy of a backup may be subsequently restored to the file server 190 (or to another computer or server system) in the event that it becomes necessary to do so. Recovery of a backup copy, may have a variety of uses. For example, it may be used during system deployment for the setup of many computers. Another use may include data recovery. The backup may allow restoration of a system after data loss caused by an operating system crash, a virus attack, hardware failure, or otherwise.

In one embodiment, the backup manager 158 may create a backup of clients 110 and 120 directly without using file server 190. Such a backup may be performed to protect data on clients 110 and 120, which may not yet be updated on file server 190. In embodiment, the backup manager 158 may perform file-by-file backups of data stored on clients 110 and 120. Clients 110 and 120 may have been offline for a period of time while data was updated on the memory medium 130. Alternatively, the users may not yet have manually updated files from memory medium 130 to file server 190 even while online. Again, the backup manager 158 may receive user input directing the backup manager 158 to create file-by-file backups of clients 110 and 120. In some embodiments, the backup manager 158 may automatically create file-by-file backups of clients 110 and 120 if they are connected to network 180. In this case, a scheduled regular backup may be implemented, such as a daily or weekly scheduled backup of clients 110 and 120.

It is noted during any backup operation of any source, such as file server 190, clients 110 and 120, or otherwise, that different types of a backup operation may be performed. The backup discussed above may contain the complete contents and structure representing a storage medium, such as data 192 on file server 190 or memory medium 130 on client 110. This backup file may be created by performing a complete sector-by-sector, or alternatively, a byte-by-byte, copy of the data on a data storage medium. This copy thereby replicates the structure and contents of this data. A volume image backup file may contain all files and may replicate all data. In another embodiment, a file-by-file backup operation may provide the contents and structure representing particular files stored on clients 110 and 120. In yet another embodiment, a backup system may not backup boot information and files locked by the operating system, such as those in use at the time of the backup.

As part of creating a backup, such as a file-by-file backup of clients 110 and 120, the backup manager 158 may also create catalog metadata 156 associated with the corresponding files, or data objects. The catalog metadata 156 created by the backup manager 158 during a backup operation, such as a backup of data on client 110, may include metadata for the files. Metadata may include at least one or more of the following: a data name, data size, a fingerprint of the data, a batch number, as well as data type, version number, ownership, permissions, modification time, error code, etc. A batch number may be used to identify the particular backup operation in which an associated backup entry was created. Other forms of metadata and/or identifiers will be apparent to those of ordinary skill in the art. The catalog metadata 156 may be usable for restore browsing, e.g., at a later time.

Referring again to client 110, in addition to including software applications on memory medium 130, client 110 may also contain backup system agent software 114. Generally speaking, an agent is a software routine that may wait for a detection of a predetermined event and perform one or more actions when such a detection occurs. For example, agents may transmit a summary file at a certain hour on a predetermined day or monitor incoming data and alert the user when a certain transaction has arrived. The backup system agent 114, or backup agent 114, may be software configured to assist the backup manager 158 on the backup server 150 to perform one or more backup functions. In some embodiments the backup system agent 114 may also be configured to perform one or more backup functions independently of a backup manager 158.

Endpoint Virtualization Aware Backup

In one embodiment, the backup agent 114 may be configured to interface directly with the virtualization agent 112 on client 110. As described earlier, the backup agent 114 may include program code that interfaces directly with an API within the virtualization agent 112. For example, the backup agent 114 may interface directly with an API included in a DLL of the virtualization agent 112 in order to access information within the endpoint virtualization system. The identification of a virtual software layer corresponding to a particular file may be accessed to allow for efficient backup of files. In one example, the backup manager 158 may query, or cause backup agent 114 to query, the virtualization agent 112 on a client in order to discover the virtual software layers and corresponding files stored on the client. In one embodiment, corresponding information and metadata related to the virtual software layer(s) on the client may then be reported to the backup manger (e.g., directly or via the backup agent 114) by the virtualization agent 112. The backup manager 158 may then store this information for subsequent access. In one embodiment, the backup manager 158 may use this reported information as part of a backup operation. For example, the backup manager 158 may wish to backup only those files within a particular virtual software layer identified by the query operation. By using the reported information, the backup manager may generate appropriate backup commands that identify only files corresponding to a given virtual layer for backup and cause only those files and related data to be backed up.

For example, in one embodiment the backup manager 158 may direct the backup agent 114 to send only files within a user data layer 132 for backup storage. Following the backup request from the backup manager, the backup agent 114 may send both the corresponding files and metadata including the virtual software layer information. The backup manager may receive, compile, and/or store the received files and metadata in such a way that it is identified as data corresponding to client user data layers 176. Following receipt of the data, the backup manager 158 may send the corresponding files stored in client user data layers 176 to backup storage device 160 for backup storage. In addition, the backup manager 158 may store virtual layer related metadata in catalog metadata 156. The information stored in catalog metadata 156 may be used for browsing prior to a restore operation.

Figure 2:
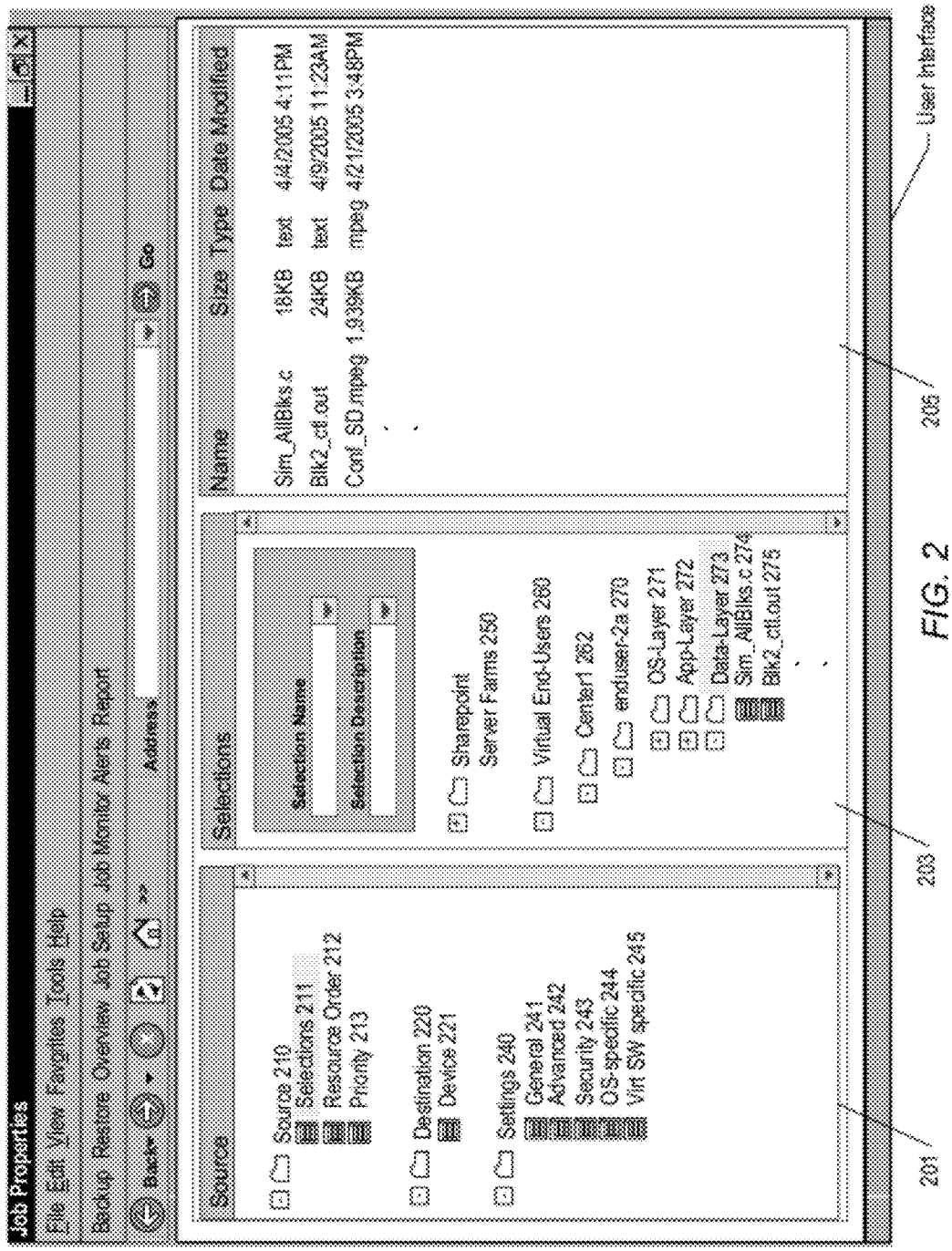
FIG. 2 illustrates one embodiment of a graphical user interface that may be presented by a backup application for selecting specific lists or virtual software layers for backup and/or restore.

Turning now to FIG. 2, one embodiment of a graphical user interface (GUI) 200 is shown. The GUI 200 may be presented by a file system or other on backup server 150 of FIG. 1. The GUI 200 may be used for selecting specific files or virtual software layers to be backed up or restored. Interface 200 may include features such as drop-down menus, a navigation bar, an address field, and so on. Within interface 200 are shown a "Source" pane 201 and a "Selections" pane 203. The interface 200 may include panes, buttons, and functionalities described further below.

Within Source pane 201, a hierarchy of sources, destinations, settings, and otherwise may be seen and navigated. In one embodiment, the illustrated hierarchy may include source 210, destination 220, and settings 240 with corresponding selections below them. Selections 211 may be selected as indicated by a highlighted background and added to pane 203. Pane 203 may include pull-down menus for a selection name of a predetermined backup operation and a corresponding selection description. A virtual end-users folder 260 may include a Center 1 folder 262 corresponding to a group of end-user computers. Other such folders as Center 1 folder 262 may be included under Virtual End-Users folder 260, although not shown. One such end-user computer may correspond to the enduser-2a folder 270. In one embodiment, catalog metadata 156 may be accessed, and the stored virtual software layer identification information may allow for browsing of backed up data on backup storage device 160 corresponding to different virtual software layers within this particular end-user computer. In another embodiment, corresponding stored virtual software layer identification information may allow for browsing of data stored on one or more clients. The data being browsed may correspond to the data on the clients at the time of a most recent query operation. Regardless, if the data being browsed corresponds to backup data or client-stored data reported by a query, the layers may be generally represented in a logical format, such as folders OS-Layer 271, App-Layer 272, and Data-Layer 273. Each of these folders may comprise other folders corresponding to the number of virtual software layers and organization of these layers on the end-user computer. It is noted that a virtual software layer may be represented in a GUI as a folder or any other logical object, even when the backup data does not actually contain a corresponding physical object. Such a depiction in the GUI may simply be a convenient mechanism for identifying and/or manipulating a virtual layer in the backup. A categorization of backup information corresponding to virtual software layers is represented to a user via the GUI as folders 271, 272, and 273. However, folders 271, 272, and 273 are not generally actual folders such as Center 1 folder 262 and enduser-2a folder 270. Actual folders such as Center 1 folder 262 may include files corresponding to a particular virtual software layer. In addition, Center 1 folder 262 may include other files that do not correspond to the particular virtual software layer.

Continuing with the end-user computer folder, enduser-2a folder 270, the files corresponding to data virtual software layer may be shown for browsing. Again, a backup manager 158 of FIG. 1 may be able to provide this information for browsing due to the virtual software layer information stored in the catalog metadata 156 in backup server 150. Pane 205 of GUI 200 may show the files stored on the corresponding end-user computer. A user may browse these files and choose one or more files for a subsequent backup operation. This action may be done in pane 205 by selecting files with a mouse button and using a menu button, or by using a hot-key stroke on the keyboard. Alternatively, another pane may be used for selecting files and scheduling a backup operation. Also, a user may select a folder representing a virtual software layer, such as OS-Layer folder 271 to prohibit a backup of the files within this virtual software layer. A common image may be used for folders 271, 272, and other folders that represent virtual software layers. Therefore, a backup of the files within these virtual software layers, which are represented by folders 271, 272, and 273, may be unnecessary. In one embodiment, the files within a data virtual software layer, such as a layer represented by Data-Layer 273, and any other layers without a predetermined common image may be the only files used after a backup operation.

Prohibiting a backup operation, including an incremental backup operation, from accessing files within chosen virtual software layers may greatly speed up the backup operation. In addition, the amount of data to store may be greatly reduced.

It is noted that the naming conventions depicted in FIG. 2 (e.g., "Source 210", "Settings 240", etc.) are provided for ease of discussion. In a typical embodiment, names reflective of those used in ordinary business or other environments (e.g., documents, spreadsheets, as well as user-defined categories and/or category names, etc.) may be used, as desired.

Figure 3:
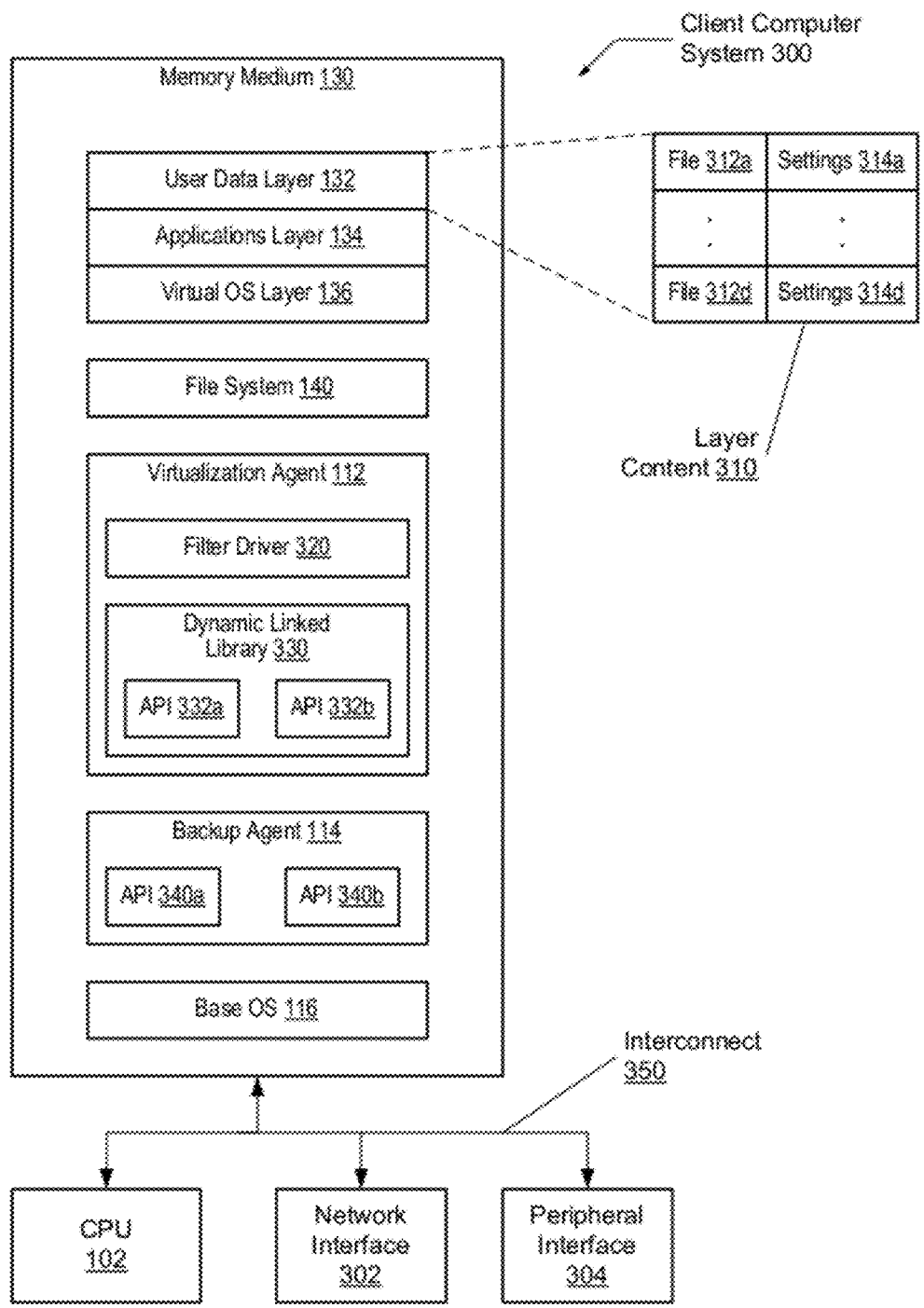
FIG. 3 is a generalized block diagram illustrating one embodiment of a client computer system.

Referring to FIG. 3, one embodiment of a client computer system 300 is shown. The same system components used in network architecture 100 of FIG. 1 are numbered identically. It is noted that FIG. 3 is provided as an example for purposes of discussion, and in other embodiments the client computer system 300 may take on various other forms. Client computer system 300 may be representative of any client computer systems, such as clients 110 and 120, described herein. Similarly, client computer system 300 may be used to implement any of the below-described methods. Client computer system 300 may be any of various types of devices, including, but not limited to, a personal computer system, desktop computer, laptop or notebook computer, handheld computer, workstation, network computer, a consumer device, etc, or in general any type of computing device.

As described earlier, the hardware of client computer system 300 may include a central processing unit (CPU), or processor, 102 for executing instructions of software applications. Although only one processor 102 is shown, client computer system 300 may comprise multiple processors. Each processor may include one or more cores, any of which may be single or multi-threaded. Each processor may utilize conventional processor design techniques such as complex branch prediction schemes, out-of-order execution, a superscalar microarchitecture, and register renaming techniques. Each processor may include circuitry for executing instructions according to a predefined instruction set. For example, the SPARC instruction set architecture (ISA) may be selected. Alternatively, the x86, x86-64, Alpha, PowerPC, MIPS, PA-RISC, or any other instruction set architecture may be selected. Generally, each processor may access a cache memory subsystem for data and instructions. Each processor may contain its own level 1 (L1) and level 2 (L2) caches in order to reduce memory latency.

Client computer system 300 may also include one or more network interfaces 302 for transmitting and receiving data, such as to or from other client computer systems or server computer systems, as described herein. Network interface 302 may provide a direct connection to a remote server via a direct network link to the Internet via a POP (point of presence). Network interface 302 may provide such connection using wireless techniques, including digital cellular telephone connection, Cellular Digital Packet Data (CDPD) connection, digital satellite data connection or the like. Client computer system 300 may further include one or more peripheral interfaces 304 for receiving user input or displaying output to users, such as a keyboard, mouse or other pointing device, touch screen, and a monitor or other visual display device. Various embodiments may include fewer or additional components not illustrated in FIG. 3 (e.g., video cards, audio cards, additional network interfaces, peripheral devices, an Ethernet interface, etc.).

Client computer system 300 may include an interconnect 350 which interconnects major subsystems of client computer system 300. In one embodiment, interconnect 350 is a system bus that may allow data communication between the subsystems. Client computer system 300 may include memory medium 130, which may comprise a system memory and persistent storage devices. System memory may comprise one or more levels of cache, SRAM, DRAM, RDRAM, EDO RAM, DDR 10 RAM, SDRAM, Rambus RAM, EEPROM, etc. Persistent storage devices may comprise optical storage, magnetic storage, hard drive, tape drive, solid-state memory, etc. The persistent storage devices may include various computer files and software applications such as databases, email applications, office productivity applications, the base OS 116, the file system 140, the virtualization agent 112, the backup agent 114, and a variety of others as known in the art.

The system memory within client computer system 300 may contain computer programs comprising program instructions encoded in platform native binary, any interpreted language such as Java® byte-code, or in any other language such as C/C++, Java®, etc or in any combination thereof. The system memory may also contain user data files. As described earlier, the virtualization agent 112 may be used to create virtual software layers on client computer system 300. Examples of these layers include the virtual OS layer 136, the applications layer 134, and the user data layer 132. Each virtual software layer may comprise layer content 310, such as multiple files 312a-312d with corresponding settings, or registry entries, 314a-314d. As used herein, elements referred to by a reference numeral followed by a letter may be collectively referred to by the numeral alone. For example, files 312a-312d may be collectively referred to as files 312. Files 312 may correspond a particular virtual software layer due to an IT administrator creating such a setting during installation. The associated registry entries, or settings, 314 may contain layer metadata and a corresponding redirection area.

As shown, the backup agent 114 comprises one or more APIs 340. One of these APIs may transmit messages or jobs from or to a backup manager 158 within the backup server 150 via the network interface 302. For example, the backup agent 114 may listen for, or attempt to detect, a connection on a predetermined port. Once a connection is made, additional connections between the backup agent 114 and the backup manager 158 may be made on ports previously specified in a backup system installation package. For backup operations that correspond to using endpoint virtualization information, wherein the information may include an associated virtual software layer, the backup agent may communicate with the virtualization agent 112. For example, code within the backup agent 114 may use API 340a for communication with the backup manager 158 via the network interface 302. Alternatively, code within the backup agent 114 may directly communicate with an API within the backup manager 158 via the network interface 302. Similarly, in order to interface with the virtualization agent 112, code within the backup agent 114 may communicate with the API 332a in the DLL 330 of the virtualization agent 112.

Using the above description of the connections between the APIs and the network interface 302, in one example, the backup manager 158 of FIG. 1 may send a job corresponding to only backing up data files within the user data layer 132. The IT administrator who setup the job may not be interested in backing up files within the applications layer 134 and the virtual OS layer 136, since these files may correspond to stored common images of the layers. The backup agent 114 may receive this job through the network interface 302. The backup agent 114 may interface directly with the virtualization agent 112 via the API 332a in the DLL 330. In one embodiment, the virtualization agent 112 may report to the backup agent 114 the associated virtual software layer information for each file. In another embodiment, the virtualization agent 112 may provide a list of files associated with the specified virtual software layer, such as the user data layer 132. The backup agent 114 may subsequently send the identified files to the backup manager 158 via the network interface 302.

Again, using the above description of the connections between the APIs, in a second example, the backup manager 158 of FIG. 1 may send a job corresponding to an incremental backup of files on client computer system 300. Again, the IT administrator who setup the job may not be interested in backing up files within the applications layer 134 and the virtual OS layer 136, since these files may correspond to stored common images of the layers. The backup agent 114 may receive the incremental backup job through the network interface 302. The backup agent 114 may interface directly with the virtualization agent 112 via the API 332a in the DLL 330. In one embodiment, the virtualization agent 112 may report to the backup agent 114 the associated virtual software layer information for each file. In another embodiment, the virtualization agent 112 may provide a list of files associated with the specified virtual software layer, such as the user data layer 132. The backup agent 114 may subsequently scan only the identified files in order to detect changed files. Detected changed files may be sent to the backup manager 158 via the network interface 302.

Figure 4:
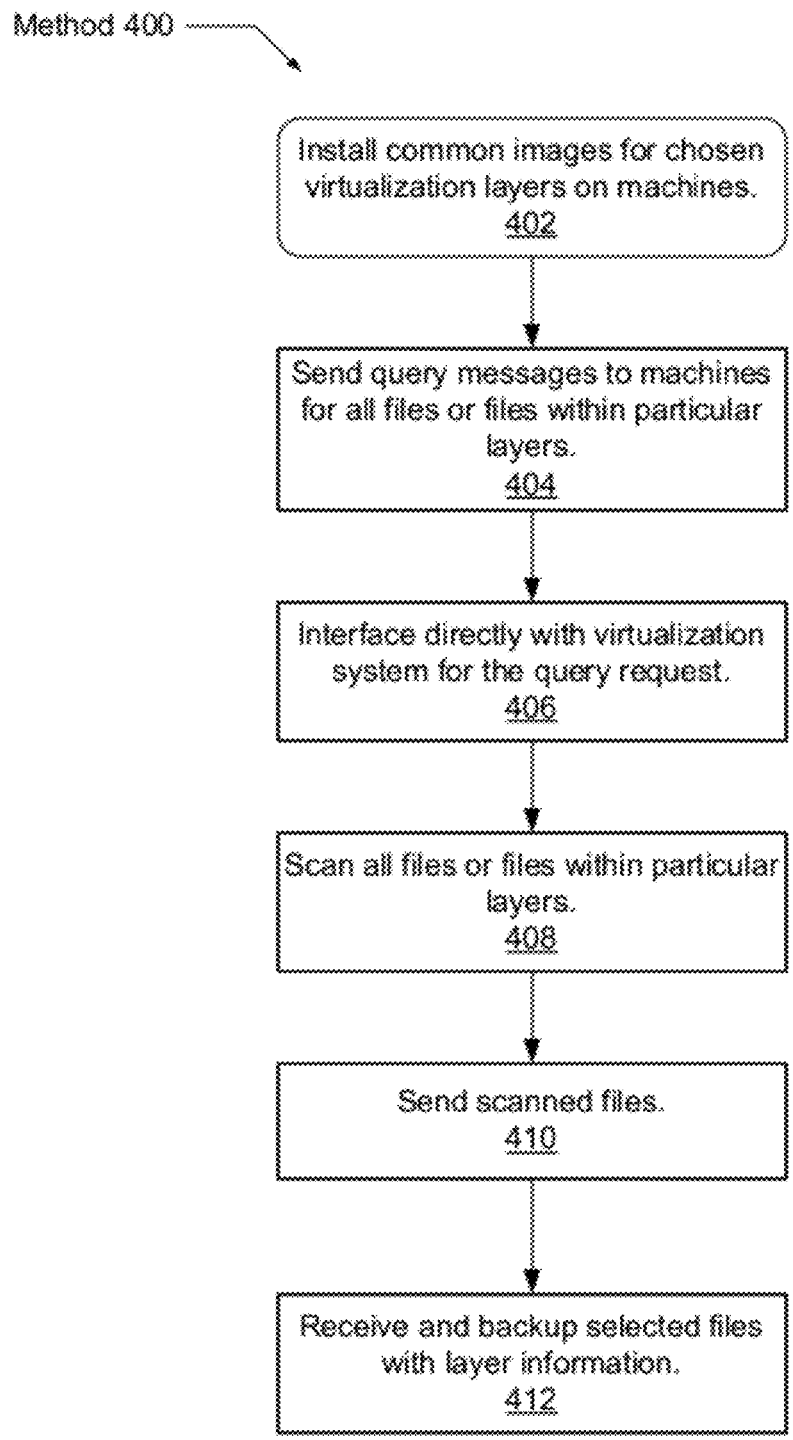
FIG. 4 is a flow diagram illustrating one embodiment of determining the virtual software layer information associated with files on a client computer system.

Referring to FIG. 4, one embodiment of a method 400 for backing up files from a client computer system to a backup storage device is shown. In addition to a backup operation, a determination of the virtual software layer information associated with files on a client computer system may be made. The components embodied in the computer system described above may generally operate in accordance with method 400. For purposes of discussion, the steps in this embodiment are shown in sequential order. However, some steps may occur in a different order than shown, some steps may be performed concurrently, some steps may be combined with other steps, and some steps may be absent in another embodiment.

In block 402, an IT administrator installs common images for chosen virtual software layers on chosen client computer systems. The chosen layers may be a virtual OS layer, a virtual applications layer, or both. In block 404, in order to identify virtual layers on particular client computer machines, or to determine the files within chosen virtual software layers, the IT administrator may cause query messages or jobs to be sent to the particular client computer machines. For example, the IT administrator may wish to determine what files are currently stored within a user data layer. A backup manager software application may be used to send the messages. In one embodiment, the IT administrator may set up a scheduled back up operation, such as a back up of all online client computer systems at a certain hour of a certain day(s) of the week. The backup operation may send backup messages or jobs, rather than simply a query message. These backup messages may request a backup of all files or a backup of files within a particular virtualization layer.

In block 406, a backup agent on each chosen client computer system may receive query messages seeking to discover the data and layers on the corresponding clients. For example, a backup manager on a backup server may initiate a discovery type procedure to determine the content and nature of data stored on one or more clients. In one embodiment, the backup manager generates queries which are conveyed to the clients. On a given client/endpoint which includes components of a virtualization system (e.g., a virtualization agent), a virtualization component on the client may be configured to respond to the query, or otherwise provide information to a backup agent on the client in response to the query. In block 408, the files on the client computer system may be scanned. In response to a discovery type query request, the backup agent may respond with data that identifies the content of the data stored on the client. In one embodiment, a virtualization component on the client provides information regarding virtual layers on the client, data corresponding to each of the virtual layers (e.g., which files correspond to which virtual layers), and other metadata related to the virtualization system. The virtualization component then provides the information directly to the backup manager, provides it to the backup agent for conveyance to the backup manger, or otherwise makes the information available to the backup manager. In block 410, in one embodiment, this information may be sent to the backup manager via a network from the backup agent. In block 412, for a query operation, the backup manager 158 may save the received information. At a later time, this saved information may be accessed in order to initiate a backup operation. In block 412, for a backup operation, the received files may be saved by the backup manager. In one embodiment, the received files may be directly stored on a data storage medium, such as backup storage medium 160 of FIG. 1. In another embodiment, if the received files correspond to a virtual software layer, then the received files may be temporarily stored in location 176 in memory medium 170. Subsequently, the received files may be sent to backup storage medium 160 to complete the backup operation. Corresponding metadata information, such as the virtual software layer associated with each file, may also be stored.

Figure 5:
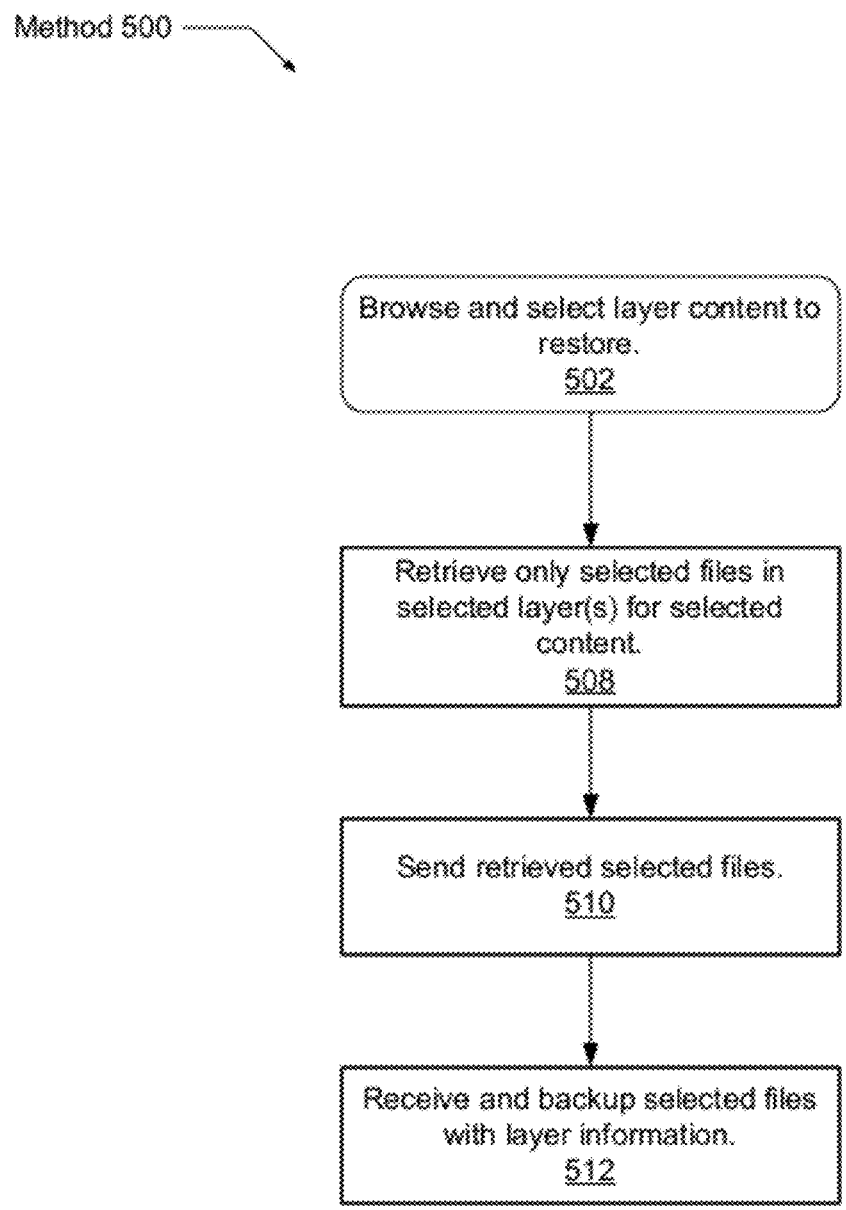
FIG. 5 is a flow diagram illustrating one embodiment of restoring only selected files based on a virtual software layer.

Turning now to FIG. 5, one embodiment of a method 500 for restoring selected files based on a virtual software layer is shown. The components embodied in the computer system described above may generally operate in accordance with method 500. For purposes of discussion, the steps in this embodiment are shown in sequential order. However, some steps may occur in a different order than shown, some steps may be performed concurrently, some steps may be combined with other steps, and some steps may be absent in another embodiment.

In block 502, an IT administrator may browse both available virtual software layers and files stored on a backup storage device. This browsing may be in response to a requested restore operation from a client. Corresponding metadata information, such as the virtual software layer associated with each file, may be stored in a catalog, such as the catalog metadata 156 of FIG. 1. A visual display on a workstation or backup server running a backup manager may be used. The IT administrator may select particular files within a layer for restore. Alternatively, the IT administrator may select an entire layer, which includes all files within the layer. In one embodiment, the file-associated virtual software layer information may be stored in a catalog, such as catalog metadata 156 of FIG. 1. This file-associated virtual software layer information may have been previously stored in the catalog during a previous backup operation. One example of a previously performed backup operation is described above by method 400.

In block 508, particular selected files on a backup storage device may be retrieved. In one embodiment, all files within a specified virtual software layer may have copies retrieved to send back to a backup manager. In another embodiment, only selected files within one or more virtual software layers may have copies retrieved to send back to a backup manager. Afterward, in block 510, the retrieved files may be sent to the backup manager from the backup storage device 160. In block 512, the received files may be saved by the backup manager. In one embodiment, the particular location of the stored files may be communicated to a client or a client computer system 110 or 120. In another embodiment, the retrieved files may be sent from the backup server 150 to the requesting client computer system 110 or 120.

Figure 6:
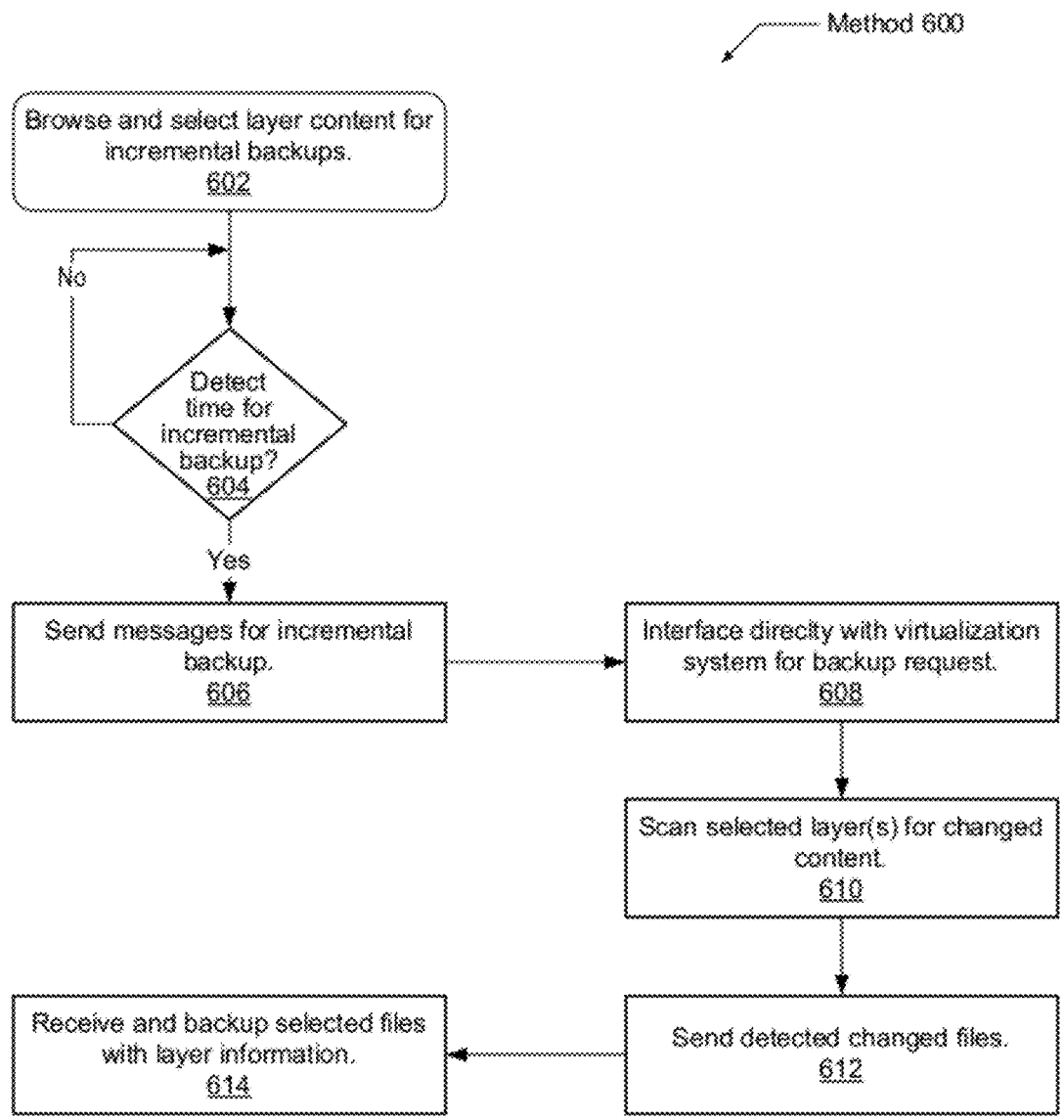
FIG. 6 is a flow diagram illustrating one embodiment of incrementally backing up only files within a selected virtual software layer.

Turning now to FIG. 6, one embodiment of a method 600 for incrementally backing up only files within a selected virtual software layer is shown. The components embodied in the computer system described above may generally operate in accordance with method 600. For purposes of discussion, the steps in this embodiment are shown in sequential order. However, some steps may occur in a different order than shown, some steps may be performed concurrently, some steps may be combined with other steps, and some steps may be absent in another embodiment.

In block 602, an IT administrator may browse both available virtual software layers and files on one or more client computer systems for an incremental backup. A visual display on a workstation or backup server running a backup manager may be used. The IT administrator may select an entire layer, which includes all files within the layer, for an incremental backup operation. For example, the IT administrator may choose a user data layer 132 for an incremental backup operation, but not choose an applications layer 134 or a virtual OS layer 136. In one embodiment, the file-associated virtual software layer information may be stored in a catalog, such as catalog metadata 156 of FIG. 1. In one embodiment, the IT administrator may setup a scheduled backup operation, such as a backup of all online client computer systems at a certain hour of a certain day(s) of the week.

If the backup manager software application detects the scheduled point-in-time for an incremental backup (conditional block 604), then in block 606, the backup manager may send incremental backup messages to one or more chosen client computer systems.

In block 608, a backup agent on each chosen client computer system may receive the incremental backup messages and interface directly with a virtualization agent within an endpoint virtualization system. The agents may use APIs for the interfacing. In block 610, files within a selected virtual software layer may be scanned in order to detect changed files. Only files within the selected virtual software layer, such as a user data layer 132, may be scanned. Files in other virtual software layers, such as the applications layer 134 and the virtual OS layer 136, may not be scanned to detect changed files.

In block 612, the detected changed files within the selected layer may be sent to the backup manager from the backup agent via a network. In block 614, may be saved by the backup manager. In one embodiment, the received files may be stored on a data storage medium, such as backup storage medium 160 of FIG. 1. Corresponding metadata information, such as the virtual software layer associated with each file, may be stored in a catalog, such as the catalog metadata 156 of FIG. 1.

It is further noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer implemented method comprising:
  managing one or more virtual layers in a client computer by a virtualization agent included in the client computer, the virtualization agent being configured to make applications that reside in active virtual layers available and indistinguishable from conventionally installed applications by redirecting system calls for the application's files, processes, and settings to a predetermined redirection area of a corresponding virtual layer;
  initiating a backup procedure on a backup server to backup selected data corresponding to a selected virtual layer of the one or more virtual layers on the client computer;
  sending backup messages corresponding to the selected data to the client computer, responsive to the procedure;
  receiving the backup messages at a backup agent on the client computer from the backup server;
  in response to the backup agent on the client computer determining the selected data corresponds to the selected virtual layer of the one or more virtual layers, the backup agent:
    communicating with the virtualization agent in order to identify one or more files that correspond to the selected virtual layer;
    retrieving the one or more files; and
    sending the one or more files to the backup server.

2. The method as recited in claim 1, wherein the selected virtual layer comprises at least one of the following: a user data layer, an application layer, and an operating system layer.

3. The method as recited in claim 2, further comprising allowing browsing and selecting of particular files within particular virtual layers by a backup manager software application within the backup manager.

4. The method as recited in claim 3, wherein said browsing and selecting corresponds to at least one of the following operations: file backup, file incremental backup, and file restore.

5. The method as recited in claim 1, further comprising creating a different backup schedule for each virtual layer of a plurality of virtual layers in the client computer.

6. The method as recited in claim 2, further comprising a backup agent software program in the client computer interfacing directly with the virtualization agent to process messages from the backup server.

7. The method as recited in claim 6, wherein in response to receiving an incremental backup message from the backup server, the method further comprises ignoring files outside of the selected virtual layer in identifying files which have changed since a last backup.

8. The method as recited in claim 7, wherein when performing a backup of data in only a virtual layer, the backup agent is configured to perform the backup procedure without communicating with the virtualization agent.

9. A computer system comprising:
a backup server coupled to a data storage medium; and
a client computer coupled to the backup server, wherein the client computer comprises:
a backup agent; and
a virtualization agent configured to manage one or more virtual layers in the client, the virtualization agent being configured to make applications that reside in active virtual layers available and indistinguishable from conventionally installed applications by redirecting system calls for the application's files, processes, and settings to a predetermined redirection area of a corresponding virtual layer;
wherein the backup server is configured to:
initiate a backup procedure to backup selected data corresponding to a selected virtual layer of the one or more virtual layers stored on the client; and
send backup messages corresponding to the selected data to the client computer, responsive to the procedure;
wherein the backup agent is configured to:
receive the backup messages from the backup server;
in response to determining the selected data corresponds to the selected virtual layer of the one or more virtual layers:
communicate with the virtualization agent in order to identify one or more files that correspond to the selected virtual layer;
retrieve the one or more files; and
send the one or more files to the backup server.

10. The computer system of claim 9, wherein the selected virtual layer comprises at least one of the following: a virtual user data layer, a virtual application layer, and a virtual operating system layer.

11. The computer system of claim 10, wherein the backup server comprises a backup manager software application configured to allow browsing and selecting of particular files within particular virtual layers.

12. The computer system of claim 11, wherein said browsing and selecting corresponds to at least one of the following operations: file backup, file incremental backup, and file restore.

13. The computer system of claim 9, wherein the backup manager is further configured to create a different backup schedule for each virtual layer of a plurality of virtual layers in the client computer.

14. The computer system of claim 10, wherein the backup agent is configured to interface directly with the virtualization agent to process messages from the backup server.

15. The computer system of claim 14, wherein in response to receiving an incremental backup message from the backup server, the backup agent is configured to ignore files outside of the selected virtual layer in identifying files which have changed since a last backup.

16. The computer system of claim 9, wherein the backup server is further configured to:
initiate a restore procedure to restore selected data corresponding to a selected virtual layer of the one or more virtual layers stored on the backup storage medium;
receive the selected data from the backup storage medium; and
send the selected data to the client computer, responsive to the procedure.

17. A computer-readable storage medium storing program instructions that are executable to:
manage one or more virtual layers in a client computer by a virtualization agent, the virtualization agent being configured to make applications that reside in active virtual layers available and indistinguishable from conventionally installed applications by redirecting system calls for the application's files, processes, and settings to a predetermined redirection area of a corresponding virtual layer;
initiate a backup procedure on a backup server to backup selected data corresponding to a selected virtual layer of the one or more virtual layers stored on the client computer;
send backup messages corresponding to the selected data to the client computer, responsive to the procedure;
receive the backup messages at a backup agent on the client computer from the backup server;
in response to determining the selected data corresponds to the selected virtual layer of the one or more virtual layers, cause the backup agent to:
communicate with the virtualization agent in order to identify one or more files that correspond to the selected virtual layer;
retrieve the one or more files; and
send the one or more files to the backup server.

18. The computer-readable storage medium of claim 17, wherein the selected virtual layer comprises at least one following: a user data layer, an applications layer, and an operating system layer.

19. The computer-readable storage medium of claim 18, wherein said program instructions are further executable to browse and select particular files within particular virtual layers corresponding to at least one of the following operations: file backup, file incremental backup, and file restore.

20. The computer-readable storage medium of claim 17, wherein in response to determining the selected data does not correspond to the selected virtual layer of the one or more virtual layers, said program instructions are further executable to perform the backup procedure without communicating with the virtualization agent.

21. The method as recited in claim 1, wherein when a given virtual layer of the one or more virtual layers is inactive, the virtualization agent is configured to obscure the existence of the given layer from the base operating system of the client computer.

* * * * *